US010023736B2

(12) United States Patent
Corveleyn et al.

(10) Patent No.: US 10,023,736 B2
(45) Date of Patent: Jul. 17, 2018

(54) HYBRID FLUOROELASTOMER COMPOSITION, CURABLE COMPOSITION, AND METHODS OF MAKING AND USING THE SAME (71) Applicant: 3M INNOVATIVE PROPERTIES COMPANY, St. Paul, MN (US)

(72) Inventors: Steven G. Corveleyn, Knokke-Heist (BE); Rudolf J. Dams, Antwerp (BE); Miguel A. Guerra, Woodbury, MN (US); Tom Opstal, Laarne (BE)

(73) Assignee: 3M Innovative Properties Company, St. Paul, MN (US)

( * ) Notice: Subject to any disclaimer, the term of this patent is extended or adjusted under 35 U.S.C. 154(b) by 15 days.

(21) Appl. No.: 15/118,736

(22) PCT Filed: Feb. 18, 2015

(86) PCT No.: PCT/US2015/016386
§ 371 (c)(1),
(2) Date: Aug. 12, 2016

(87) PCT Pub. No.: WO2015/126949
PCT Pub. Date: Aug. 27, 2015

(65) Prior Publication Data
US 2017/0044367 A1 Feb. 16, 2017

Related U.S. Application Data (60) Provisional application No. 61/941,668, filed on Feb. 19, 2014.

(51) Int. Cl.
C08G 73/10 (2006.01)
C08K 3/00 (2018.01)
C08L 71/00 (2006.01)
C08G 65/00 (2006.01)

(52) U.S. Cl.
CPC ............ C08L 71/00 (2013.01); C08G 65/007 (2013.01); *C08G 2650/48* (2013.01); *C08L 2205/025* (2013.01); *C08L 2207/04* (2013.01)

(58) Field of Classification Search
None
See application file for complete search history.

(56) References Cited

U.S. PATENT DOCUMENTS

| 3,125,599 | A | 3/1964 | Warnell |
| 3,250,807 | A | 5/1966 | Fritz |
| 3,250,808 | A | 5/1966 | Moore, Jr. |
| 3,392,097 | A | 7/1968 | Gozzo |
| 3,644,300 | A | 2/1972 | Dorfman |
| 3,646,085 | A | 2/1972 | Bartlett |
| 3,699,145 | A | 10/1972 | Sianesi |
| 3,810,874 | A | 5/1974 | Mitsch |
| 4,102,872 | A | 7/1978 | Griffin |
| 4,434,106 | A | 2/1984 | Rosser |
| 4,647,413 | A | 3/1987 | Savu |
| 5,288,376 | A | 2/1994 | Oyama |
| 5,334,681 | A | 8/1994 | Mueller |
| 5,446,205 | A | 8/1995 | Marchionni |
| 5,453,549 | A | 9/1995 | Koike |
| 5,545,693 | A | 8/1996 | Hung |
| 5,593,748 | A | 1/1997 | Hubbard |
| 5,605,973 | A | 2/1997 | Yamamoto |
| 5,688,872 | A | 11/1997 | Sonoi |
| 5,700,879 | A | 12/1997 | Yamamoto |
| 5,714,637 | A | 2/1998 | Marchionni |
| 5,767,204 | A | 6/1998 | Iwa |
| 6,114,452 | A | 9/2000 | Schmiegel |
| 6,281,296 | B1 | 8/2001 | MacLachlan |
| 6,465,576 | B1 | 10/2002 | Grootaert |
| 6,638,999 | B2 | 10/2003 | Bish |
| 6,716,534 | B2 | 4/2004 | Moore |
| 6,835,782 | B1 | 12/2004 | Morita |
| 6,956,085 | B2 | 10/2005 | Grootaert |
| 7,208,553 | B2 | 4/2007 | Grootaert |

(Continued)

FOREIGN PATENT DOCUMENTS

EP 0 493 320 7/1992
WO WO 2001-27194 4/2001

(Continued)

OTHER PUBLICATIONS

Jeffamine Polyetheramines (Huntsman Product Information Sheet), publicaly available google.com on Nov. 3 2013, pp. 1-7.*
Paciorek, "Reactions of Perfluoronitriles. I. Interactions With Aniline", Journal of Fluorine Chemistry, vol. 30, 1985, pp. 241-250.
Wlassics, "Synthesis of α, ω perfluoropolyether iodides", Journal of Fluorine Chemistry, 2005, vol. 126, pp. 45-51.

(Continued)

*Primary Examiner* — Robert T Butcher
(74) *Attorney, Agent, or Firm* — Bradford B. Wright (57) ABSTRACT A curable composition comprises a fluorinated polyether represented by the formula: $Z^1-X^1_p$ and a nonfluorinated polyether represented by the formula $Q^1-X^2_y Z^1$ represents a p-valent perfluorinated polyether group. $Q^1$ represents a y-valent hydrocarbon polyether group. Each $X^1$ and $X^2$ group independently represents a functional group. p and y are integers ≥2. At least some of the p $X^1$ groups are reactive to at least some of the y $X^2$ groups to form a covalently cross-linked polymer network. Hybrid fluoroelastomers made by curing the curable compositions are also disclosed.

16 Claims, 1 Drawing Sheet

(56) References Cited

U.S. PATENT DOCUMENTS

| | | |
|---|---|---|
| 7,247,749 B2 | 7/2007 | Aufdermarsh |
| 7,521,510 B2 | 4/2009 | Aufdermarsh |
| 9,290,619 B2 | 3/2016 | Guerra |
| 2001/0049408 A1* | 12/2001 | Jing ................. B32B 27/08 524/252 |
| 2004/0019153 A1 | 1/2004 | Coughlin et al. |
| 2007/0141425 A1 | 6/2007 | Arase |
| 2008/0249240 A1* | 10/2008 | Bandyopadhyay ...... C08K 5/14 524/847 |
| 2012/0009438 A1 | 1/2012 | Dams |
| 2012/0220719 A1 | 8/2012 | Corveleyn et al. |

FOREIGN PATENT DOCUMENTS

| | | | |
|---|---|---|---|
| WO | WO 2006-074085 | | 7/2006 |
| WO | WO 2006-102383 | | 9/2006 |
| WO | WO 2009-076389 | | 6/2009 |
| WO | WO 2012-005972 | | 1/2012 |
| WO | WO 2012/121898 | * | 9/2012 |
| WO | WO 2012-138457 | | 10/2012 |
| WO | WO 2014-209635 | | 12/2014 |

OTHER PUBLICATIONS

International Search Report for PCT International Application No. PCT/US2015/016386, dated May 6, 2015, 4pgs.

* cited by examiner

HYBRID FLUOROELASTOMER COMPOSITION, CURABLE COMPOSITION, AND METHODS OF MAKING AND USING THE SAME

TECHNICAL FIELD

The present disclosure broadly relates to fluorinated elastomer compositions, curable compositions for making them, and articles containing them.

BACKGROUND

Fluoroelastomer rubbers and fluorosilicone elastomer rubbers are used in many automotive and industrial applications because of their resistance to extreme environmental and service conditions. These elastomers typically retain their elastomeric properties over a broad temperature range. For example, in some applications these materials can be exposed to temperatures below −40° C., or even below −100° C., for an extended period of time. In other applications, they can be used in environments having a temperature of 200° C. or even higher. In addition, fluoroelastomer and fluorosilicone elastomer rubbers generally have excellent resistance to fuels and oils, making them useful for sealing applications in aerospace, automotive, and chemical processing industries.

One drawback of fluoroelastomer rubber and fluorosilicone elastomer rubbers has been their high cost to manufacture. There is a need for new low cost materials and methods for making elastomeric compositions with properties comparable to fluorosilicone elastomers and/or fluorosilicone elastomer rubbers.

SUMMARY

In one aspect, the present disclosure provides a curable composition comprising:
a fluorinated polyether represented by the formula:

$Z^1$—$X^1{}_p$ wherein
$Z^1$ represents a p-valent perfluorinated polyether group;
each $X^1$ group independently represents a functional group selected from the group consisting of: —I; —Br; —Cl; —CN; nonfluorinated monovalent organic groups containing at least one —I, —Br, —Cl, —CN; and nonfluorinated monovalent free-radically polymerizable ethylenically-unsaturated organic groups; and
p is an integer greater than or equal to 2; and
a nonfluorinated polyether represented by the formula $Q^1$-$X^2{}_y$ wherein
$Q^1$ represents a y-valent hydrocarbon polyether group;
each $X^2$ group independently represents a functional group selected from the group consisting of: aminoalkyl groups having from 1 to 6 carbon atoms, N-alkylaminoalkyl groups having from 2 to 12 carbon atoms, and nonfluorinated monovalent free-radically polymerizable ethylenically-unsaturated organic groups; and
y is an integer greater than or equal to 2, and
wherein at least some of the p $X^1$ groups are reactive to at least some of the y $X^2$ groups to form a covalently cross-linked polymer network.

In another aspect, the present disclosure provides a method of making a hybrid fluoroelastomer composition, the method comprising:
providing a curable composition according to the present disclosure; and
curing the curable composition.

In yet another aspect, the present disclosure provides a shaped article obtained by injection or compression molding a curable composition according to the present disclosure.

In yet another aspect, the present disclosure provides a hybrid fluoroelastomer composition having a polymer backbone comprising:
perfluoropolyether segments having a number average molecular weight of 400 to 15,000 grams per mole, wherein the perfluoropolyether segments comprise at least one divalent monomeric unit selected from the group consisting of —$C_4F_8O$—, —$C_3F_6O$—, —$C_2F_4O$—, —$CF_2O$—, and combinations thereof; and
hydrocarbon polyether segments having a number average molecular weight of from 100 to 25,000 grams per mole, wherein the hydrocarbon polyether segments are connected through one or more covalent bonds to the perfluoropolyether segments.

As used herein, the term "hydrocarbon polyether group" refers to a single or multivalent group consisting of carbon, hydrogen, and oxygen atoms wherein each oxygen atom is covalently bonded to two carbon atoms that are not also multiply bonded to a heteroatom (e.g., O, N, S). Preferably, the each oxygen atom is covalently bonded to two carbon atoms.

As used herein, the term "fluoropolyether segment" refers to a single or multivalent group consisting of carbon, fluorine, and oxygen atoms wherein each oxygen atom is covalently bonded to two carbon atoms that are not also multiply bonded to a heteroatom (e.g., O, N, S). Preferably, the each oxygen atom is covalently bonded to two carbon atoms.

Advantageously, curable compositions and cured compositions according to the present disclosure have relatively lower cost than fluorosilicone elastomers and/or fluorosilicone elastomer rubbers while achieving comparable physical properties. Accordingly, in some embodiments, curable compositions and hybrid fluoroelastomer compositions according to the present disclosure may be free of silicone-based compounds.

Features and advantages of the present disclosure will be further understood upon consideration of the detailed description as well as the appended claims.

BRIEF DESCRIPTION OF THE DRAWINGS

It should be understood that numerous other modifications and embodiments can be devised by those skilled in the art, which fall within the scope and spirit of the principles of the disclosure. The FIGURE may not be drawn to scale.

DETAILED DESCRIPTION

Hybrid fluoroelastomer compositions according to the present disclosure have low glass transition temperatures, and have sufficient mechanical strength to be used in the preparation of shaped articles. Due to their low glass transition temperatures shaped articles including them may remain flexible at low temperatures. In some embodiments, hybrid fluoroelastomer compositions according to the present disclosure may have a first glass transition temperature of less than −50° C. and a second glass transition temperature of less than −100° C.

Hybrid fluoroelastomer compositions according to the present disclosure typically have high chemical resistance to organic solvents such as ketones, esters, and alcohols. For example, in some embodiments, shaped articles made from the hybrid fluoroelastomer compositions may have a volume swell in acetone of less than 100 percent, preferably less than 75 percent, and more preferably less than 50 percent.

The hybrid fluoroelastomer compositions can be prepared by curing one or more of the fluorinated polyethers in the presence of one or more of the nonfluorinated polyethers by a curing reaction. The curing reaction generally involves forming a crosslinked polymeric network. Curing can be achieved, for example, by a condensation reaction or free-radical curing reaction (e.g., a free-radical polymerization reaction) of the fluorinated polyether(s) with the nonfluorinated polyether(s) and/or a curing agent, optionally in the presence of a coagent.

As used herein, the term "condensation reaction" means the formation of one or more covalent bonds between at least two reactive species with either elimination of a small molecule (e.g., water) or resulting in formation of a 3, 4, 5, or 6-membered ring (e.g., of three nitriles to form a triazine). In a typical condensation curing system, catalyst(s) and/or crosslinker(s) (a material that is reactive through condensation with the fluorinated polyether(s) and the nonfluorinated polyether(s) and any optional coagents) facilitate curing via condensation. In some embodiments, the fluorinated polyether(s) and the nonfluorinated polyether(s) and any optional coagents may condense spontaneously, more preferably on heating, without any added catalyst or crosslinker.

In a free-radical curing reaction, free-radicals are generated by one or more free-radical-generating compounds such as, for example, a thermal initiator, a redox initiator, and/or a photoinitiator. The free-radicals are typically generated under the influence of heat or radiation, such as actinic radiation, or as the result of a redox reaction.

The fluorinated polyether(s) and nonfluorinated polyethers, which are both typically liquids (however this is not a requirement) have functional groups that are reactive in a curing reaction to cause reaction between the fluorinated polyethers and the nonfluorinated polyethers, thus providing the hybrid fluoroelastomer composition.

In some embodiments, the cured hybrid fluoroelastomer compositions contain perfluoropolyether segments that are linked with nonfluorinated hydrocarbon polyether segments as a result of the radical curing reaction or a condensation reaction. These components and methods will now be described in greater detail.

Curable compositions according to the present disclosure include a fluorinated polyether and a nonfluorinated polyether.

The fluorinated polyether is represented by the formula:

$$Z^1 - X^1_p$$

Each $X^1$ group independently represents a functional group selected from the group consisting of: —I; —Br; —Cl; —CN; nonfluorinated monovalent organic groups containing at least one —I, —Br, —Cl, —CN (preferably having from 2 to 12 carbon atoms); and nonfluorinated monovalent free-radically polymerizable ethylenically-unsaturated organic groups (preferably having from 1 to 12 carbon atoms). Groups $X^1$ may be attached to $Z^1$ at terminal and/or side chain locations along a fluorinated polyether polymer backbone. Preferably, $X^1$ groups are attached to $Z^1$ at at least both terminal locations along the fluorinated polyether polymer backbone. Examples of nonfluorinated monovalent organic groups containing at least one —I, —Br, —Cl, —CN and having from 2 to 12 carbon atoms include —CH$_2$CH$_2$I, —CH$_2$CH$_2$Br, —CH$_2$CCl$_3$, and —CH$_2$CN. Preferably, the nonfluorinated monovalent free-radically polymerizable ethylenically-unsaturated organic groups are selected from the group consisting of vinyl, allyl, allyloxy, acryloxy, methacryloxy, and combinations thereof.

At least one of the abovementioned functional groups (preferably the majority of or all of the functional groups) is preferably positioned at a terminal position of the fluorinated polyether, or at a position adjacent to the terminal position. The term "terminal position" as used herein includes the terminal position of a perfluoropolyether backbone or segment, but may further include a terminal position of a side chain in the case of a non-linear perfluoropolyether.

The quantity p represents an integer greater than or equal to 2 (e.g., 2, 3, 4, 5, or more). In some preferred embodiments, p is 2.

$Z^1$ represents a p-valent perfluorinated polyether group (e.g., divalent in the case that p is 2). In some preferred embodiments, $Z^1$ comprises a polymer backbone comprising at least one divalent monomeric unit selected from the group consisting of —C$_4$F$_8$O—, —C$_3$F$_6$O—, —C$_2$F$_4$O—, —CF$_2$O—, and combinations thereof, p is 2, and each $X^1$ is independently bonded to the polymer backbone at a terminal position or at a position that is adjacent to the terminal position of the polymer backbone.

Exemplary groups $Z^1$ include perfluorinated polyether groups containing perfluoroalkylenoxy groups (i.e., monomeric units) selected from —C$_4$F$_8$O— (linear or branched), —C$_3$F$_6$O— (linear or branched), —C$_2$F$_4$O—, —CF$_2$O—, and combinations thereof. Preferably, these monomeric units are arranged randomly along the perfluoropolyether backbone; however, they may be arranged in blocks, if desired. Suitable fluorinated polyethers can have a linear backbone or they can be branched, in which case the backbone may have side chains attached. The side chains may, likewise, contain perfluoroalkylenoxy groups (i.e., monomeric units) selected from —C$_4$F$_8$O— (linear or branched), —C$_3$F$_6$O— (linear or branched), —C$_2$F$_4$O—, —CF$_2$O—, and combinations thereof. Examples of —C$_3$F$_6$O— units include —CF$_2$CF$_2$CF$_2$O— and —CF$_2$CF(CF$_3$)O—. Examples of —C$_4$F$_8$O— units include —CF$_2$CF$_2$CF$_2$CF$_2$O—, —CF$_2$CF$_2$CF(CF$_3$)O—, —CF$_2$CF(CF$_2$CF$_3$)O—, and —CF$_2$C(CF$_3$)$_2$O—.

Suitable fluorinated polyethers may include one or more reactive functional groups that are reactive with a curative (e.g., a free-radical curing system or a polyamine crosslinker), forming bonds (i.e., crosslinks) between the fluorinated polyether and/or between the fluorinated polyether and the nonfluorinated polyether. In some, the fluorinated polyether contains two or more (e.g., three or four) functional groups that are reactive to the free-radical curing system. In some, the fluorinated polyether contains two or more (e.g., three or four) functional groups that are reactive to a polyamine curing system.

In some preferred embodiments, the fluorinated polyethers are perfluorinated. As used herein, the terms "perfluoro" and "perfluorinated" refers to an organic group or an organic compound wherein all hydrogen atoms bound to carbon have been replaced by fluorine atoms. A perfluorinated group or compound may, however, contain atoms other than fluorine and carbon atoms such as, for example, N, O, Cl, Br, and I. For example, $F_3C$— and $F_3CO$— correspond to perfluoromethyl and perfluoromethoxy, respectively.

Likewise, as used herein, the term "fluorinated" refers to an organic group or an organic compound wherein at least some, but not necessarily all, hydrogen atoms bound to carbon have been replaced by fluorine atoms. For example, the fluorinated organic groups $F_3C$—, $F_2HC$— and $F_2HCO$— correspond to perfluoromethyl, difluoromethyl, and difluoromethoxy groups, respectively.

In some preferred embodiments, the fluorinated polyethers comprise at least one segment that consists essentially of monomeric units selected from —$CF_2O$—, —$C_2F_4O$—, —$C_3F_6O$—, —$C_4F_8O$—, and combinations of one or more —$CF_2O$—, —$C_4F_8O$—, —$C_3F_6O$—, and —$C_2F_4O$— units. The term "consisting essentially of" used in reference to a polymer containing specified monomeric units, means the polymer contains at least 80 mole percent, preferably at least 90 mole percent, and more preferably at least 95 mole percent of the specified monomeric units.

Exemplary useful fluorinated polyethers include those represented by the general formula Each $R^1$ independently represents a functional group that is reactive to the free-radical curing system such as, for example, (i) a halo group selected from iodo (—I), bromo (—Br), chloro (—Cl), and combinations thereof, with one or more iodo groups being preferred; (ii) monovalent organic groups containing one or more —I, —Br, —Cl, —CN, and (iii) monovalent free-radically polymerizable ethylenically-unsaturated organic groups (preferably containing from 1 to 10 carbon atoms such as, for example, acryloxy or methacryloxy).

$Z^2$ denotes a divalent perfluoropolyether segment comprising, consisting essentially of, or even consisting of, perfluoroalkylenoxy groups selected from —$C_4F_8O$—, —$C_3F_6O$—, —$C_2F_4O$—, —$CF_2O$—, and combinations thereof. Preferably, $Z^2$ comprises monomeric units selected from —$(CF_2)_4O$—, —$(CF_2)_2O$—, —$CF_2O$—, or a combination thereof such as, for example, combinations of —$(CF_2)_4$— and —$(CF_2)_2O$— units; —$(CF_2)_4O$—, —$(CF_2)_2O$— and —$CF_2O$— units; —$(CF_2)_2O$— and —$CF_2$— units; or —$(CF_2)_4$— and —$CF_2$— units.

In some embodiments, the fluorinated polyether is represented by the general formula wherein each $R^2$ independently represents an organic functional group that is reactive to a free-radical curing system, and w, x, y and z are independently integers of from 0 to 30, with the proviso that w+x+y+z≥6, and wherein the perfluoroalkylenoxy monomeric units may be placed randomly or in blocks.

Preferably, each $R^2$ independently represents a free-radically polymerizable ethylenically-unsaturated group —$Z^3$— $CW^2$=$CW^2_2$ wherein each $W^2$ independently represents H, Cl, F, or —$CF_3$, with the proviso that at least one $W^2$ is H, and $Z^3$ represents a covalent bond or an alkylene group having from of 1 to 10 carbon atoms, optionally substituted by at least one of fluorine, chlorine, oxygen, nitrogen, or sulfur, or a combination thereof (e.g., —$CH_2O$—, —$CH_2CH_2$—, —$OCH_2$—, —$OC(=O)$— (i.e., oxycarbonyl), —$(CH_2)_{10}$—, or —$CH_2OC(=O)$—). In some embodiments, each $R^2$ independently represents a group selected from —I, —Br, and —Cl; a cyano group; an acryloxy group; or a methacryloxy group. Preferably, x and y are independently integers from 2 to 12, and z is an integer from 0 to 12, wherein the —$CF_2O$— and —$(CF_2)_2O$— units, and —$(CF_2)_4O$— units if present, are randomly arranged.

The fluorinated polyether may be (and typically is) provided as a mixture of fluorinated polyethers (e.g., having different molecular weight and/or composition).

Useful fluorinated polyethers are typically liquid at 25° C. and about 1 bar (0.1 MPa) for pressure, although this is not a requirement. They may be of relatively low molecular weight. For example, suitable fluorinated polyethers generally have a number average molecular weight of ≤25000 grams/mole (g/mol), preferably ≤15000 g/mol. In some embodiments, the fluorinated polyether has a weight average molecular weight (e.g., as can be determined, for example, by size exclusion chromatography) of from 400 to 15000 g/mol, preferably from 450 g/mol to 14900 g/mol, and more preferably from 450 to 9000 g/mol.

Fluorinated polyethers containing free-radically reactive functional groups and their syntheses are known. For example, fluorinated polyethers having a backbone characterized by blocks of —$CF_2CF_2O$— units can be made from tetrafluoroethylene oxide, as described in U.S. Pat. No. 3,125,599 (Warnell). Others, made by reacting oxygen with tetrafluoroethylene are characterized by a backbone made of repeating —$CF_2O$— units (e.g., see U.S. Pat. No. 3,392,097 (Gozzo et al.)). Fluorinated polyethers having a backbone of —$C_3F_6O$— units in combination with —$CF_2O$— and —CF($CF_3$)O— units are described for example in U.S. Pat. No. 3,699,145 (Sianesi et al.). Further useful examples of fluorinated polyethers include those having a backbone of repeating —$CF_2O$— and —$CF_2CF_2O$— units as disclosed in U.S. Pat. No. 3,810,874 (Mitsch et al.). Useful fluorinated polyethers can also be obtained by the polymerization of hexafluoropropylene oxide (HFPO) using dicarboxylic fluorides as polymerization initiators as described for example in U.S. Pat. No. 4,647,413 (Savu) and U.S. Pat. No. 3,250,808 (Moore et al.). HFPO derived perfluoropolyethers are also commercially available, for example, under the trade designation "KRYTOX" from E.I. du Pont de Nemours & Co., Wilmington, Del. Fluorinated polyethers, in particular of the linear type, are also commercially available, for example, as FOMBLIN and FOMBLIN Z DEAL from Solvay Solexis, West Deptford, N.J. and DEMNUM from Daikin Industries Ltd., Osaka, Japan. The conversion of the foregoing commercially available perfluoropolyethers to perfluoropolyethers containing functional groups suitable for use as fluorinated polyethers in the present disclosure can be carried out by known methods of organic synthesis.

For example, perfluoropolyethers having cyano groups can be obtained from the corresponding precursor perfluoropolyethers as described, for example, in U.S. Pat. No. 3,810,874 (Mitsch et al.); U.S. Pat. No. 4,647,413 (Savu); and U.S. Pat. No. 5,545,693 (Hung et al.). By their way of synthesis, the precursor perfluoropolyethers typically have acid fluoride end groups. These acid fluoride end groups may be converted to esters via reaction with an appropriate alcohol (such as methanol). The esters may be subsequently converted to amides via reaction with ammonia. The amides may then be dehydrated to nitriles in an appropriate solvent (such as N,N-dimethylformamide (DMF)) with pyridine and trifluoroacetic anhydride. Alternatively, the amides may be dehydrated with other reagents such as $P_2O_5$ or $PCl_3$.

Fluorinated polyethers having halo groups (especially iodo groups) can be obtained, for example, from halogen exchange reactions of a corresponding perfluoropolyether carbonyl fluoride with potassium iodide (KI) or lithium iodide (LiI) as described in U.S. Pat. No. 5,288,376 (Oyama et al.) or by Wlassics et al. in *Journal of Fluorine Chemistry* (2005), vol. 126(1), pages 45-51.

Fluorinated polyethers having ethylenically-unsaturated groups can be obtained, for example, from the reaction of perfluoropolyether esters with allylamine, diallylamine, or 2-aminoethyl vinyl ether using methods described in U.S. Pat. No. 3,810,874 (Mitsch et al.). Other preparations include dehalogenation of perfluoropolyethers such as described in U.S. Pat. No. 5,453,549 (Koike et al.). Perfluoropolyethers having an acrylic functional group can be obtained from the corresponding alcohol after reaction with acryloyl chloride in the presence of a tertiary amine (e.g., triethylamine).

Fluorinated polyether is preferably present in an amount of at least 30 weight percent by weight based on the total weight of the curable composition. Typical amounts include at least 35 weight percent or at least 40 weight percent, preferably at least 50 weight percent or even at least 70 weight percent based on the total weight of the curable composition.

While $Z^1$ may be partially fluorinated, preferably $Z^1$ is perfluorinated. In some preferred embodiments, $Z^1$ comprises a polymer backbone comprising at least one divalent monomeric unit selected from the group consisting of $-C_4F_8O-$, $-C_3F_6O-$, $-C_2F_4O-$, $-CF_2O-$, and combinations thereof, p is 2, each $X^1$ is independently bonded to the polymer backbone at a terminal position or at a position that is adjacent to the terminal position of the polymer backbone.

The nonfluorinated polyether is represented by the formula $$Q^1\text{-}X^2_q$$

$Q^1$ represents a q-valent hydrocarbon polyether group. Exemplary groups $Q^1$ include hydrocarbon polyether groups containing alkylenoxy groups (i.e., monomeric units) selected from $-C_4H_8O-$ (linear or branched), $-C_3H_6O-$ (linear or branched), $-C_2H_4O-$, $-CH_2O-$, and combinations thereof. Preferably, these monomeric units are arranged randomly along a polyether backbone; however, they may be arranged in blocks, if desired. Suitable nonfluorinated polyethers can have a linear backbone or they can be branched, in which case the backbone may have side chains attached. The side chains may, likewise, contain alkylenoxy groups (i.e., monomeric units) selected from $-C_4H_8O-$ (linear or branched), $-C_3H_6O-$ (linear or branched), $-C_2H_4O-$, $-CH_2O-$, and combinations thereof. Examples of $-C_3H_6O-$ units include $-CH_2CH_2CH_2O-$ and $-CH_2CH(CH_3)O-$. Examples of $-C_4H_8O-$ units include $-CH_2CH_2CH_2CH_2O-$, $-CH_2CH_2CH(CH_3)O-$, $-CH_2CH(CH_2CH_3)O-$, and $-CH_2C(CH_3)_2O-$.

The quantity q represents an integer greater than or equal to 2 (e.g., 2, 3, 4, 5, or more). In some preferred embodiments, p is q.

Each $X^2$ group independently represents a functional group selected from the group consisting of: aminoalkyl groups having from 1 to 6 carbon atoms (preferably having from 1 to 3 carbon atoms), alkylaminoalkyl groups having from 2 to 12 carbon atoms (preferably having from 2 to 6 carbon atoms), and nonfluorinated monovalent free-radically polymerizable ethylenically-unsaturated organic groups (preferably having from 2 to 12 carbon atoms, and more preferably 2 to 4 carbon atoms).

Groups $X^2$ may be attached to $Q^1$ at terminal and/or side chain locations along a nonfluorinated polyether polymer backbone. Preferably, $X^2$ groups are attached to $Q^1$ at at least both terminal locations along the nonfluorinated polyether polymer backbone. Examples of aminoalkyl groups having from 1 to 6 carbon atoms include aminomethyl, aminoethyl (e.g., 2-aminoethyl), aminopropyl (e.g., 3-aminopropyl and 2-aminopropyl), aminobutyl, aminopentyl, and aminohexyl. Examples of N-alkylaminoalkyl groups include N-methylaminomethyl, N-methylaminoethyl, N-ethylaminoethyl, N-hexylaminopropyl (e.g., N-ethyl-3-aminopropyl, N-methyl-2-aminopropyl, N-ethyl-2-aminopropyl, N-hexyl-2-aminopropyl), N-ethyl-4-aminobutyl, N-methyl-5-aminopentyl, and N-hexyl-6-aminohexyl.

Preferably, the nonfluorinated monovalent free-radically polymerizable ethylenically-unsaturated organic groups are selected from the group consisting of vinyl, allyl, allyloxy, acryloxy, methacryloxy, and combinations thereof. Examples of monovalent free-radically polymerizable ethylenically-unsaturated organic groups $X^2$ include groups represented by the formula $-Z^4-CW^2=CW^2_2$, wherein each $W^2$ independently represents H, or $-CH_3$. $Z^4$ represents a covalent bond or an alkylene or substituted alkylene group containing from 1 to 10 carbon atoms (e.g., $-CH_2CH_2-$, $-CH_2CH(CH_3)-$, and $-(CH_2)_{4-10}-$) optionally containing chlorine, oxygen, nitrogen, or sulfur atoms, or a combination thereof (e.g., $-CH_2O-$, $-OCH_2-$, $-OC(=O)-$ (i.e., oxycarbonyl), $-$, $-CH_2CH_2OC(=O)-$), with the proviso that at least one $W^2$, and preferably two or three $W^2$, represents H.

Examples of free-radically polymerizable ethylenically-unsaturated groups include $-CH=CH_2$ (i.e., vinyl), $-OCH=CH_2$ (i.e., vinyloxy), $-C(=O)OCH=CH_2$), $-C(=O)NHCH=CH_2$, $-CH_2C(=O)CH=CH_2$, $-CH_2CH=CH_2$ (i.e., allyl), $-OCH_2CH=CH_2$, $-C(=O)OCH_2CH=CH_2$, $-OC(=O)CH=CH_2$ (i.e., acryloxy), $-OC(=O)C(CH_3)=CH_2$ (i.e., methacryloxy), $-NHC(=O)CH=CH_2$ (i.e., acrylamido), and $-OC(=O)C(CH_3)=CH_2$ (i.e., methacrylamido). The nonfluorinated polyether may also contain a combination of different functional groups, for example, as described above. In a preferred embodiment, the functional groups are of the same type (e.g., the functional groups all contain free-radically polymerizable ethylenically-unsaturated groups or all contain amines).

At least one of the abovementioned functional groups (preferably the majority of or all of the functional groups) is preferably positioned at a terminal position of the hydrocarbon polyether, or at a position adjacent to the terminal position. The term "terminal position" as used herein includes the terminal position of a hydrocarbon polyether backbone or segment, but may further include a terminal position of a side chain in the case of a non-linear perfluoropolyether. Preferably, the hydrocarbon polyether contains two or more (e.g., three or four) functional groups that are reactive to the free-radical curing system.

In some preferred embodiments, the hydrocarbon polyethers comprise at least one segment that consists essentially of monomeric units selected from $-CH_2O-$, $-C_2H_4O-$, $-C_3H_6O-$, $-C_4H_8O-$, and combinations of one or more $-CH_2O-$, $-C_4H_8O-$, $-C_3H_6O-$, and $-C_2H_4O-$ units. The term "consisting essentially of" used in reference to a polymer containing specified monomeric units, means the polymer contains at least 80 mole percent, preferably at least 90 mole percent, and more preferably at least 95 mole percent of the specified monomeric units.

Exemplary useful hydrocarbon polyethers include those represented by the general formula Each $R^3$ independently represents a functional group that is reactive to the free-radical curing system such as, for example, monovalent free-radically polymerizable ethylenically-unsaturated organic groups (preferably containing from 1 to 10 carbon atoms such as, for example, allyloxy, acryloxy, or methacryloxy).

$Q^2$ denotes a divalent hydrocarbon polyether segment comprising, consisting essentially of, or even consisting of, alkylenoxy groups selected from —$C_4H_8O$—, —$C_3H_6O$—, —$C_2H_4O$—, —$CH_2O$—, and combinations thereof. Preferably, $Q^2$ comprises monomeric units selected from —$(CH_2)_4O$—, —$(CH_2)_2O$—, —$CH_2O$—, or a combination thereof such as, for example, combinations of —$(CH_2)_4O$— and —$(CH_2)_2O$— units; —$(CH_2)_4O$—, —$(CH_2)_2O$— and —$CH_2O$— units; —$(CH_2)_2O$— and —$CH_2O$— units; or —$(CH_2)_4$— and —$CH_2O$— units.

In some embodiments, the hydrocarbon polyether is represented by the general formula wherein each $R^4$ independently represents a nonfluorinated organic functional group that is reactive to a free-radical curing system, and w, x, y and z are as previously defined, and wherein the alkylenoxy monomeric units may be placed randomly or in blocks.

In some embodiments, each $R^4$ represents a free-radically polymerizable ethylenically-unsaturated group —$CH_2$—$Z^5$—$CW^3$=$CW^3_2$ wherein: each $W^3$ independently represents H or —$CH_3$; and $Z^5$ represents a covalent bond or an alkylene or substituted alkylene group containing from 1 to 10 carbon atoms (e.g., —$CH_2CH_2$—, —$CH_2CH(CH_3)$—, and —$(CH_2)_{4-10}$—), optionally containing chlorine, oxygen, nitrogen, or sulfur atoms, or a combination thereof (e.g., —$CH_2O$—, —$OCH_2$—, —$OC(=O)$— (i.e., oxycarbonyl), —$CH_2OC(=O)CH_2OC(=O)$—, —$CH_2OC(=O)NH$—, —$CH_2CH_2OC(=O)$—), with the proviso that at least one $W^3$, and preferably two or three $W^3$ represents H.

The hydrocarbon polyether may be (and typically is) provided as a mixture of hydrocarbon polyethers (e.g., having different molecular weight and/or composition). Hydrocarbon polyethers useful in practice of the present disclosure can be synthesized by known methods or obtained from commercial sources.

Aminoalkyl-terminated polyoxyalkylenes and N-alkylaminoalkyl-terminated polyoxyalkylenes can be made according to known methods or obtained from commercial sources. By way of example, aminoalkyl-terminated polyoxyalkylenes can be obtained from the corresponding hydrocarbon polyether polyols (e.g., diol or triol) by reaction with a corresponding aziridine (e.g., 2-methylaziridine or aziridine). Compounds of this type are commercially available from Huntsman Corp., Houston, Tex., under the trade designation JEFFAMINE. Examples include polyether diamines available as JEFFAMINE D-230, JEFFAMINE D-2000, JEFFAMINE D-4000, JEFFAMINE ED-600, JEFFAMINE ED-900, and polyether triamines available as JEFFAMINE T-403, JEFFAMINE T-3000, and JEFFAMINE T-5000. Poly(alkylene oxide) diallyl ethers can be made according to known methods or purchased from commercial sources. By way of example, these can be obtained from reaction of hydrocarbon poly(alkylene oxide) polyols with allyl chloride or allyl bromide in the presence of base. Such poly(alkylene oxide) diallyl ethers are available from Hangzhou Develly Technology Co, Shanghai, China, for example, as AEA-200-2000, a poly(ethylene glycol) diallyl ether.

Likewise, poly(alkylene oxide) divinyl ethers can be made according to known methods or purchased from commercial sources. By way of example, these can be prepared by reacting hydrocarbon poly(alkylene oxide) polyols with acetylene under pressure and in the presence of a catalyst. Such poly(alkylene oxide) divinyl ethers are available from for example BTC, Sweden as DVE-3.

In the case of poly(alkylene oxide) di(meth)acrylates, they may be obtained, for example, by reaction of the corresponding poly(alkylene oxide) diol with (meth)acryloyl chloride or methyl (meth)acrylate. As used herein, the term "(meth)acryl" refers to "methacryl" and/or "acryl". Examples of poly(alkylene oxide) di(meth)acrylates include SR259 polyethylene glycol (200) diacrylate, SR344 polyethylene glycol (400) diacrylate, SR610 polyethylene glycol (600) diacrylate, SR603 polyethylene glycol (400) dimethacrylate, SR252 polyethylene glycol (600) dimethacrylate, SR210 polyethylene glycol dimethacrylate, SR210A polyethylene glycol dimethacrylate, and SR644 polypropylene glycol (400) dimethacrylate, all available from Sartomer Corp., Exton, Pa.

Useful nonfluorinated polyethers are typically liquid at 25° C. and about 1 bar (0.1 MPa) for pressure, although this is not a requirement. They may be of relatively low molecular weight. For example, suitable hydrocarbon polyethers generally have a number average molecular weight of ≤25000 grams/mole (g/mol), preferably ≤15000 g/mol. In some embodiments, the hydrocarbon polyether has a weight average molecular weight (e.g., as can be determined, for example, by size exclusion chromatography) of from 1000 to 25000 g/mol, preferably from 100 to 20000 g/mol, and more preferably from 100 to 15000 g/mol.

Non-fluorinated polyethers containing free-radically reactive functional groups and their syntheses are known. Non-fluorinated polyether is preferably present in an amount of at least 30 weight percent by weight based on the total weight of the curable composition. Typical amounts include at least 35 weight percent or at least 40 weight percent, preferably at least 50 weight percent or even at least 70 weight percent based on the total weight of the curable composition.

Useful curing systems may additionally include at least one coagent to facilitate curing. Useful coagents comprise at least two functional groups capable of reacting with the functional groups of the fluorinated polyether and the functional groups of the nonfluorinated polyether under radical conditions to provide crosslinking.

In some embodiments, the coagent includes a polyunsaturated compound capable of reacting with the functional groups of the fluorinated polyether and the non fluorinated polyether in the presence of a free-radical-generating compound under the formation of crosslinks. Examples include fluorinated olefins such as divinylperfluorohexane, and polyhalogenated organic compounds such as, for example, carbon tetrabromide and pentaerythritol tetrabromide. In some embodiments, the coagent is selected from polyvinyl or polyallyl compounds. Examples include triallyl cyanurate, triallyl isocyanurate (TAIC), triallyl trimellitate, tri(methylallyl) isocyanurate, tris(diallylamine)-s-triazine, triallyl phosphite, N,N-diallylacrylamide, N,N,N',N',N",N"-hexaallylphosphoramide; N,N,N',N'-tetraallylterephthalamide; N,N,N',N'-tetraallylinalonamide; trivinyl isocyanurate; methyl-2,4,6-trivinyltrisiloxane; N,N'-m-phenylenebismaleimide; diallyl phthalate, and tri(5-norbornyl-2-methylene) cyanurate. A particular suitable coagent is triallyl isocyanurate.

The coagent is typically present in an amount of from 0 to 20 parts per hundred by weight (pph), preferably between 0 and 10 pph, of the fluorinated polyether and nonfluorinated polyether combined. The coagent may be added as such or it may be present on a carrier. A typical example for a carrier is silica.

A free-radical curing system may comprise a single free-radical initiator or a combination of two or more free-radical generating compounds. Useful free-radical-generating compounds include thermal initiators (e.g., peroxides and some azo compounds) and photoinitiators (e.g., Norrish Type I and/or Type II photoinitiators), which generate free-radicals upon activation. Activation is preferably achieved by application of thermal energy. Organic peroxides such as, for example, dialkyl peroxides or bis(dialkyl) peroxides are particularly useful. Compounds decomposing to produce free-radicals at a temperature above 50° C. are preferred. In many cases, it is preferred to use a di(t-butyl) peroxide having a tertiary carbon atom attached to the peroxy oxygen. Among the most useful peroxides of this type are 2,5-dimethyl-2,5-di(t-butylperoxy)hex-3-yne and 2,5-dimethyl-2,5-di(t-butylperoxy)hexane. Other peroxides can be selected from compounds such as but not limited to dicumyl peroxide, dichlorobenzoyl peroxide, t-butyl perbenzoate, α,α'-bis(t-butylperoxy)-p-diisopropylbenzene (i.e., dicumyl peroxide), and di[1,3-dimethyl-3-(t-butylperoxy)-butyl]carbonate.

Typically, about 2 to 10 parts of the free-radical curing system per 100 parts of fluorinated polyether and nonfluorinated polyether are used, but this is not a requirement.

In the case that functional groups of the fluorinated polyether comprise cyano groups (i.e., —C≡N), the crosslink density of the cured hybrid fluoroelastomer composition can be increased by adding an additional crosslinker that will cause crosslinking through the formation of triazine groups in addition to radical crosslinking. Useful examples of such additional crosslinking agents include tetraphenyltin and perfluorosebacamidine.

Useful condensation-type curing agents contain at least one, preferably two reactive groups separated by a linking group. The reactive groups include primary and/or secondary amine groups, or a blocked version thereof. "Blocked amines" as referred to herein are compounds which decompose upon heating to produce at least one primary or secondary amine. Preferably, they decompose at a temperature between 40° C. and 200° C., or between 80° C. and 170° C. The amine groups are thus generated in situ, i.e. during the curing reaction. Examples of blocked amines include carbamates.

These functional groups are capable of reacting with, for example, cyano groups of the fluorinate and/or nonfluorinated polyethers to form triazine groups. Curing agent is consumed and incorporated (at least with the linking group described below) into the polymer structure during the curing reaction, which distinguishes them from curing catalysts. Curing catalysts are not consumed or do not get incorporated into the polymer.

Examples of suitable optional polyamine curing agents include alkylenediamines (e.g., ethylenediamine, hexamethylenediamine, 1,10-diaminodecane, and 1,12-diaminododecane), aniline, melamine, bisphenol diamine, 9,9-bis(3-aminopropyl)fluorene, 2-(4-aminophenyl)ethylamine, 1,4-butanediol bis(3-aminopropyl)ether, $N(CH_2CH_2NH_2)_3$, 1,8-diamino-p-menthane, 4,4'-diaminodicyclohexylmethane, 1,3-bis(3-aminopropyl)tetramethyldisiloxane, 1,8-diamino-3,6-dioxaoctane, 1,3-bis(aminomethyl)cyclohexane, polymeric polyamines such as linear or branched (including dendrimers), homopolymers and copolymers of ethyleneimine (i.e., aziridine), $H_2N(CH_2CH_2NH)_2H$, $H_2N(CH_2CH_2NH)_3H$, $H_2N(CH_2CH_2NH)_4H$, $H_2N(CH_2CH_2NH)_5H$, $H_2N(CH_2CH_2CH_2NH)_2H$, $H_2N(CH_2CH_2CH_2NH)_3H$, $H_2N(CH_2CH_2CH_2CH_2NH)_2H$, $H_2N(CH_2CH_2CH_2CH_2CH_2CH_2NH)_2H$, $H_2N(CH_2)_4NH(CH_2)_3NH_2$, $H_2N(CH_2)_3NH(CH_2)_4NH(CH_2)_3NH_2$, $H_2N(CH_2)_3NH(CH_2)_2NH(CH_2)_3NH_2$, $H_2N(CH_2)_2NH(CH_2)_3NH(CH_2)_2NH_2$, $H_2N(CH_2)_3NH(CH_2)_2NH_2$, $C_6H_5NH(CH_2)_2NH(CH_2)_2NH_2$, and $N(CH_2CH_2NH_2)$.

Examples of suitable blocked polyamines include di- or poly-substituted ureas (e.g., 1,3-dimethyl urea); N-alkyl or -dialkyl carbamates (e.g., N-(tert-butyloxycarbonyl)propylamine); di- or polysubstituted thioureas (e.g., 1,3-dimethyl-thiourea); aldehyde-amine condensation products (e.g., 1,3,5-trimethylhexahydro-1,3,5-triazine) and N,N'-dialkyl phthalamide derivatives (e.g., N,N'-dimethylphthalamide). Particular useful examples of blocked amines include hexamethylene diamine carbamate, commercially available from DuPont under the trade designation DIAK 1.

The curable composition may optionally, but typically, further comprise filler and/or other additives. Preferably, the curable composition further comprises at least one filler (collectively referred to as "filler"). In preferred embodiments, the curable composition is a liquid or paste. Filler may be added to increase the viscosity to obtain a paste-like consistency. A paste-like consistency typically has a Brookfield viscosity of from 2000 to 50000 cps (from 2000 to 50000 mPa-sec) at 25° C.

In embodiments where the curable composition comprises highly viscous nonfluorinated polyethers, fillers may be used to facilitate mixing of the fluorinated polyether with the nonfluorinated polyether. For example, the fluorinated polyether may be pre-dispersed onto the filler. The pre-dispersed fluorinated polyether can then more easily be dispersed into and blended with the nonfluorinated polyether. Filler can also be used to modify or adapt the rheological and/or physical properties of the cured perfluoropolyether-nonfluorinated polyether compositions.

Filler typically comprises particles that may be spherical or non-spherical (e.g., crushed particulate material or fibers). Typically, the filler is micrometer-scale in size. Typically, they have a least one dimension being a length or a diameter of from about 0.5 microns (m) up to about 100, 1000, or 5000 microns. Preferred filler includes carbon particles and silica-containing particles with average particle sizes ($D_{50}$) in the range of from 0.5 microns to 30 microns.

Suitable filler includes inorganic or organic materials. Useful examples include sulfates (e.g., barium sulfate), carbonates (e.g., calcium carbonate), and silicates. Examples of useful silicates include silicas such as hydrophilic and hydrophobic silica, fumed silica (e.g., available under the trade designation "AEROSIL" from Evonik GmbH, Frankfurt, Germany, or under the trade designation "NANOGEL" from Cabot Corporation, Boston, Mass.), and silane-treated fumed silicas (e.g., as available under the trade designation CABOSIL from Cabot Corporation), and combinations thereof. Specific examples of fumed silicas include AEROSIL 200, AEROSIL R972, and AEROSIL R974 fumed silicas.

Further examples of silicates include calcium silicates, aluminum silicates, magnesium silicates, and mixtures thereof (e.g., mica, clays), and glasses (e.g., hollow glass microspheres available under the trade designation GLASS BUBBLES from 3M Company). Further suitable fillers include halogen-modified silicas, such as 3-halopropyltriethoxysilane or nitrile-modified silicas. Nitrile-modified silicas can for example be prepared by reacting a commercially available hydroxyl-containing silica (e.g., AEROSIL 200V densified hydrophilic fumed silica available from Evonik Degussa, Essen, Germany) with a cyanoalkylsilane such as, for example, 3-cyanopropyltriethoxysilane (available from Aldrich Chemical Co., Milwaukee, Wis.), in the presence of ethanol containing hydrochloric acid. The amount of reactants is chosen so as to obtain between 10 and 30 weight percent of cyano groups in the resultant nitrile-modified silica.

Further suitable silica-containing fillers include fluorine-modified silicas. Fluorine-modified silicas can be prepared, for example, by reacting a commercially available hydroxyl-containing silica, (for examples AEROSIL 200V) with a fluorinated organosilane. A suitable fluorinated organosilane includes HFPO-silanes, which may be prepared from oligomeric HFPO-esters and a silane such as, for example, aminoalkyltrialkoxysilane as is described in U.S. Pat. No. 3,646,085 (Bartlett). Fluorinated organosilanes can also be derived from commercially available perfluoropolyethers (e.g., FOMBLIN Z Deal perfluoropolyether from Solvay Solexis, West Deptford, N.J.) by reaction with aminoalkyltrialkoxysilanes (e.g., 3-aminopropyltrimethoxysilane) as described in U.S. Pat. No. 6,716,534 (Moore et al.). The amounts of the reactants are typically chosen so as to obtain between 1 and 5 weight percent of fluorine in the resultant fluorine-modified silica.

Other examples of suitable fillers include carbon materials such as, for example, nano-sized carbon particles (e.g., mesoporous carbon nanopowder available from Sigma-Aldrich Corp., St. Louis, Mo.), carbon nanotubes, carbon blacks (e.g., acetylene black, channel black, furnace black, lamp black, or thermal black), modified carbons (e.g., $CF_x$ available as CARBOFLUOR from Advance Research Chemicals, Catoosa, Okla.). Carbon black is commercially available, for example, from Cabot Corporation.

Filler is preferably added in an amount of from 1 to 50 pph, more preferably from 4 to 30 pph, based on the combined weight of fluorinated polyether and nonfluorinated polyether, although other amounts may also be used.

The curable compositions (and also the cured hybrid fluoroelastomer composition compositions) may include further additives, such as for example acid acceptors. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, strontium hydroxide, hydrotalcite, and zeolites (e.g., ZEOFLAIR inorganic powder available from Zeochem AG, Karst, Germany). Organic acceptors include epoxies, sodium stearate, and magnesium oxalate. Particularly suitable acid acceptors include magnesium oxide and zinc oxide. Combinations of acid acceptors may also be used. The amount of acid acceptor will generally depend on the nature of the acid acceptor used. Typically, the amount of acid acceptor used is between 0 and 5 pph based on the total combined weight of fluorinated polyether and nonfluorinated polyether.

Further useful additives include stabilizers, plasticizers, pigments, antioxidants, processing aids, rheology modifiers, lubricants, flame retardants, flame retardant synergists, antimicrobials, and further additives known in the art of fluoropolymer and/or polysiloxane compounding and rubber processing.

The curable composition may be prepared by mixing the requisite components using known mixing devices such as, for example, rotary mixers, planetary roll mixers, acoustic mixers, and high-shear mixers. The temperature of the mixture during mixing typically should not rise above the temperature at which curing begins, typically below about 120° C. The curable composition mixture can be placed in a mold and cured.

Curing may be carried out in open air (e.g., in a pressureless open mold or hot air tunnel) but is preferably carried out in a closed mold. Curing in closed molds offers the advantage of not exposing the operators to fumes generated during the curing reaction. In an alternative embodiment, curing can be done in an autoclave.

In order to improve mixing, it is recommended to first mix the fluorinated polyether with filler to pre-disperse the fluorinated polyether. For good mixing with the nonfluorinated polyether, it is preferred that the mixture of the fluorinated polyether and the filler is in the form of a powder. To this mixture may be added further fillers and additives. Preferably, mixing is accomplished using a planetary mixer or a high shear mixer.

Compositions comprising hybrid fluoroelastomer compositions are obtainable by curing the curable composition. Curing is typically achieved by heat-treating the curable composition. The heat-treatment is carried out at an effective temperature and effective time to create a crosslinked composition. The heat-treatment activates the free-radical-generating compound to produce free-radicals. Optimum conditions can be tested by examining the resulting cured composition for its mechanical and physical properties. Typically, curing is carried out at temperatures of at least 120° C., at least 150° C., or even at least 170° C. Typical curing conditions include curing at temperatures in the range of from 160° C. to 210° C., from 160° C. to 190° C. Typical curing periods include from 0.5 to 30 minutes. Curing is preferably carried out under pressure. For example, pressures of from 10 to 100 bars (1 to 10 MPa) may be applied. A post-curing cycle may be applied to ensure the curing process is fully completed. Post-curing may typically be carried out at temperatures in the range of from 170° C. to 250° C. for a period of from one to 24 hours.

The result of curing the curable composition is a composition comprising a hybrid fluoroelastomer composition. In some embodiments, the hybrid fluoroelastomer composition comprises a perfluoropolyether-nonfluorinated polyether polymer containing perfluoropolyether segments having a weight average molecular weight in the range of from 400 g/mol to 25000 g/mole, more preferably from 400 g/mol to 15000 g/mol, and containing a plurality of monomeric units selected from —$C_4F_8O$—, —$C_3F_6O$—, —$C_2F_4O$—, —$CF_2O$—, or a combination thereof, and nonfluorinated polyether segments having a molecular weight in the range of from 100 g/mol and 25000 g/mol, preferably from 100 to 20000 g/mol, more preferably from 100 to 15000 g/mol.

Hybrid fluoroelastomer compositions according to the present disclosure typically have at least one glass transition temperature of less than about −40° C., less than about −50° C., less than −60° C., less than −80° C., or even less than −100° C. Depending on the ratio of the fluorinated polyether to nonfluorinated polyether, two distinct glass transition temperatures may be observed.

In addition to low-temperature properties, hybrid fluoroelastomer composition-based cured compositions also have high chemical resistance. For example, shaped articles made from the hybrid fluoroelastomer compositions typically have a volume swell in acetone of less than 100 percent, preferably less than 80 percent, and more preferably less than 50 percent. In order to provide high chemical resistance, the fluorine content of the hybrid fluoroelastomer composition is desirably high (e.g., at least 41 weight percent, at least 52 weight percent, or even at least 56 weight percent based on the total weight of the cured composition).

Hybrid fluoroelastomer composition-based compositions have a rubber-like consistency and elastomeric properties. For example, they can typically be stretched to at least 10 percent of their initial length by applying a suitable force and return to their original length after that force is no longer applied. The hybrid fluoroelastomer composition compositions typically reach a maximum torque (MH), measured according to ASTM D 5289-93a, of greater than 4 inch-pounds (0.4 newton-meter).

Figure 1:
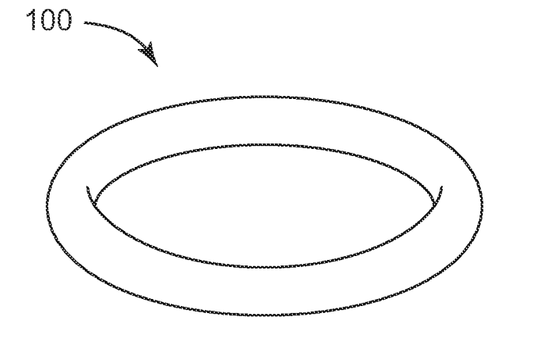
FIG. 1 is a perspective view of an exemplary shaped article 100 according to one embodiment of the present disclosure.

Exemplary useful shaped articles obtainable by injection molding or compression molding the curable composition (with curing) include gaskets, shaft seals, bearings, hoses, and O-rings. FIG. 1 shows an exemplary O-ring 100 made from hybrid fluoroelastomer according to the present disclosure.

Select Embodiments of the Present Disclosure

In a first embodiment the present disclosure provides a curable composition comprising:
  a fluorinated polyether represented by the formula:

$Z^1$—$X^1_p$ wherein
    $Z^1$ represents a p-valent perfluorinated polyether group;
    each $X^1$ group independently represents a functional group selected from the group consisting of: —I; —Br; —Cl; —CN; nonfluorinated monovalent organic groups containing at least one —I, —Br, —Cl, —CN; and nonfluorinated monovalent free-radically polymerizable ethylenically-unsaturated organic groups; and
    p is an integer greater than or equal to 2; and
  a nonfluorinated polyether represented by the formula $Q^1$-$X^2_y$ wherein
    $Q^1$ represents a y-valent hydrocarbon polyether group;
    each $X^2$ group independently represents a functional group selected from the group consisting of: aminoalkyl groups having from 1 to 6 carbon atoms, N-alkylaminoalkyl groups having from 2 to 12 carbon atoms, and nonfluorinated monovalent free-radically polymerizable ethylenically-unsaturated organic groups; and
    y is an integer greater than or equal to 2, and
  wherein at least some of the p $X^1$ groups are reactive to at least some of the y $X^2$ groups to form a covalently cross-linked polymer network.

In a second embodiment, the present disclosure provides a curable composition according to the first embodiment, wherein:
  $Z^1$ comprises a polymer backbone comprising at least one divalent monomeric unit selected from the group consisting of —$C_4F_8O$—, —$C_3F_6O$—, —$C_2F_4O$—, —$CF_2O$—, and combinations thereof;
  p is 2; and
  each $X^1$ is independently bonded to the polymer backbone at a terminal position or at a position that is adjacent to the terminal position of the polymer backbone.

In a third embodiment, the present disclosure provides a curable composition according to the first or second embodiment, wherein:
  $Q^1$ comprises a polymer backbone comprising at least one divalent monomeric unit selected from the group consisting of —$C_4H_8O$—, —$C_3H_6O$—, —$C_2H_4O$—, —$CH_2O$—, and combinations thereof;
  y is 2; and
  each $X^2$ is independently bonded to the polymer backbone at a terminal position or at a position that is adjacent to the terminal position of the polymer backbone.

In a fourth embodiment, the present disclosure provides a curable composition according to any one of the first to third embodiments, further comprising a free-radical curing system.

In a fifth embodiment, the present disclosure provides a curable composition according to the fourth embodiment, wherein the free-radical initiating system comprises a peroxide.

In a sixth embodiment, the present disclosure provides a curable composition according to any one of the first to fifth embodiments, wherein $X^2$ comprises monovalent free-radically polymerizable ethylenically-unsaturated organic groups having from 2 to 6 carbon atoms.

In a seventh embodiment, the present disclosure provides a curable composition according to any one of the first to third embodiments, further comprising a polyamine.

In an eighth embodiment, the present disclosure provides a curable composition according to any one of the first to seventh embodiments, further comprising filler.

In a ninth embodiment, the present disclosure provides a curable composition according to the eighth embodiment, wherein the filler is selected from the group consisting of silicate fillers, carbon fillers, and combinations thereof.

In a tenth embodiment, the present disclosure provides a curable composition according to any one of the first to ninth embodiments, wherein the fluorinated polyether has a number average molecular weight of from 400 to 15000 grams per mole.

In an eleventh embodiment, the present disclosure provides a curable composition according to any one of the first to tenth embodiments, wherein the fluorinated polyether comprises a random copolymer represented by the formula $R^2CF_2O(CF_2O)_w(C_2F_4O)_x(C_3F_6O)_y(C_4F_8O)_zCF_2R^2$ wherein w, x, y and z independently represent integers ranging from 0 to 30, with the proviso that w+x+y+z≥6; and
each $R^2$ independently represents a free-radically polymerizable ethylenically-unsaturated group —$CH_2$—$Z^3$—$CW^2$=$CW^2_2$, wherein:
  each $W^2$ independently represents H, Cl, F, or $CF_3$, with the proviso that at least one $W^2$ is H; and
  $Z^3$ represents —$OCH_2$— or oxycarbonyl.

In a twelfth embodiment, the present disclosure provides a curable composition according to any one of the first to eleventh embodiments, wherein the nonfluorinated polyether comprises a random copolymer represented by the formula $R^4CH_2O(CH_2)_a(C_2H_4O)_b(C_3H_6O)_c(C_4H_8O)_dCH_2R^4$ wherein w, x, y and z independently represent integers ranging from 0 to 30, with the proviso that w+x+y+z≥6; and
each $R^4$ independently represents amino, alkylamino having from 1 to 6 carbon atoms, or a free-radically polymerizable ethylenically-unsaturated group —$CH_2$—$Z^4$—$CW^3$=$CW^3_2$, wherein:
  each $W^3$ independently represents H or Cl, with the proviso that at least one W is H; and
  $Z^4$ represents —$OCH_2$— or oxycarbonyl.

In a thirteenth embodiment, the present disclosure provides a curable composition according to the twelfth embodiment, wherein each $R^4$ comprises aminoalkyl having from 1 to 2 carbon atoms.

In a fourteenth embodiment, the present disclosure provides a curable composition according to any one of the first to thirteenth embodiments, wherein on a total weight basis the curable composition comprises:

30 to 90 weight percent of the fluorinated polyether; and
70 to 10 weight percent of the nonfluorinated polyether.

In a fifteenth embodiment, the present disclosure provides a method of making a hybrid fluoroelastomer composition, the method comprising: providing a curable composition according to any one of the first to fourteenth embodiments; and curing the curable composition.

In a sixteenth embodiment, the present disclosure provides a hybrid fluoroelastomer composition having a polymer backbone comprising:

perfluoropolyether segments having a number average molecular weight of 400 to 15,000 grams per mole, wherein the perfluoropolyether segments comprise at least one divalent monomeric unit selected from the group consisting of —$C_4F_8O$—, —$C_3F_6O$—, —$C_2F_4O$—, —$CF_2O$—, and combinations thereof; and hydrocarbon polyether segments having a number average molecular weight of from 100 to 250000 grams per mole, wherein the hydrocarbon polyether segments are covalently bonded to the perfluoropolyether segments.

In a seventeenth embodiment, the present disclosure provides a hybrid fluoroelastomer composition according to the sixteenth embodiment, wherein the hybrid fluoroelastomer composition has a volume swell in acetone of less than 100 percent.

In an eighteenth embodiment, the present disclosure provides a hybrid fluoroelastomer composition according to the sixteenth or seventeenth embodiment, wherein the hybrid fluoroelastomer composition is formed into a shaped article selected from the group consisting of a gasket, a bearing, a hose, and an O-ring.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

| MATERIAL | TRADE DESIGNATION | COMPOSITION | COMPANY |
|---|---|---|---|
| Filler | NANOGEL TLD201 | hydrophobic chemically-treated silica particles | Cabot Corp., Boston, Massachusetts |
| Peroxide | TRIGONOX 101-50 | organic peroxide | Akzo Nobel, Amsterdam, The Netherlands |
| HP1 | JEFFAMINE D-2000 | polyoxypropylene-diamine (average MW = 2000 g/mol) | Huntsman Corp., The Woodlands, Texas |
| HP2 | JEFFAMINE ED-900 | aliphatic polyether diamine (polypropyleneoxy-co-polyethylenoxy-co-polypropyleneoxy based, average MW = 990 g/mol) | Huntsman Corp. |
| HP3 | JEFFAMINE T-403 | polyether triamine (propylenoxy-based, average MW = 440 g/mol) | Huntsman Corp. |
| HP4 | none | poly(propylene glycol) bis (2 aminopropyl ether), MW 4000 | Sigma-Aldrich Corp., St. Louis, Missouri |
| HP5 | none | poly(ethylene glycol) divinyl ether (MW 240) | Sigma-Aldrich Corp. |
| HP6 | none | poly(ethylene glycol) dimethacrylate (MW 750) | Sigma-Aldrich Corp. |
| Fluorosilicone | BLUESTAR FP3260U | fluorosilicone | Bluestar Silicones, Rock Hill, South Carolina |
| LTM dinitrile | none | prepared per "Preparation of LTM Dinitrile" hereinbelow | |
| HFPO diacrylate | none | prepared per "Preparation of HFPO Diacrylate" hereinbelow | |

TABLE OF MATERIALS USED IN THE EXAMPLES

Test Methods

Glass Transition Temperature ($T_g$):

$T_g$ was measured by modulated temperature differential scanning calorimetry (MDSC) using a TA Instruments Q200 modulated DSC from TA Instruments, New Castle, Del. Conditions of measurement were: −150° C. to 50° C. at 2 or 3° C./minute, modulation amplitude of +1° C./minute during 60 seconds. Glass transition temperatures were measured on press or post-cured materials. Reported are glass transition temperature midpoint $T_g$ (° C.) measured by MDSC.

Curing Properties:

Vulcanization properties were measured using an Alpha Technologies Moving Die Rheometer (MDR) (at 177° C. for a time between 2 min and 60 min with no post cure, per

Table 1 in accordance with ASTM D 5289-12 "Standard Test Method for Rubber Property—Vulcanization Using Rotorless Cure Meters" (2012), reporting minimum torque (ML), maximum torque (MH) and delta torque (which is the difference between MH and ML). Torque values are reported in cm-kg (in-lbs). Also reported are tan delta (i.e., loss modulus/storage modulus) at ML and tan delta at MH. Further reported are parameters indicating the curing speed such as Ts2 (the time required to increase the torque by two units over the ML); Tc50 (the time to increase torque above ML by 50% of delta torque), and Tc90 (the time to increase torque above ML by 90% of delta torque), all of which were reported in minutes.

Solvent Volume Swell:

Hybrid fluoroelastomer composition compositions were aged at 23° C. in acetone for 24 hours. After aging, the percent volume swell (i.e., 100×(swelled volume−initial volume)/initial volume) was determined by weighing a piece of elastomer before and after aging in air and water.

Preparation of LTM Dinitrile:

$NCCF_2O(CF_2)_{9-11}(CF_2CF_2O)_{9-11}CF_2CN$

LTM dinitrile was made starting from the perfluoropolyether diester  $CF_2C(=O)OCH_3$ (number average molecular weight of about 2,000 g/mol, obtained as FOMBLIN Z-DEAL from Solvay Solexis, Inc., West Deptford, N.J.) and converted to the perfluoropolyether dinitrile according to the process described in Example 3 of U.S. Pat. No. 5,545,693 (Hung et al.). In a first step, the perfluoropolyether diester was converted to the corresponding dicarbonamide using ammonia gas. In a second step, the dicarbonamide was converted to the corresponding dinitrile.

Preparation of HFPO Diacrylate

Oligomeric hexafluoropropylene oxide diacrylate is $CH_2=CHC(=O)OCH_2CF(CF_3)O[CF_2CF(CF_3)O]_n—C_4F_8O—[CF(CF_3)CF_2O]_nCF(CF_3)CH_2OC(=O)CH=CH_2$ of 2280 number average molecular weight was prepared as described below.

In a 600 mL Parr reactor was charged 47 g (0.24 mol) of perfluorosuccinyl fluoride, available from Exfluor Research Corp., Round Rock, Tex., 7 g of KF (0.12 mol) and 100 g of tetraglyme, available from Aldrich Company, and cooled to 0° C. followed by addition of 548 g (3.3 mol) of hexafluoropropylene oxide, available from E.I. du Pont de Nemours and Co. (Wilmington, Del.) over four hours as described in U.S. Pat. No. 3,250,807 (Fritz et al.). A total of six reactions were completed, combined and reacted with excess methanol, and water washed to isolate 2540 g of oligomeric hexafluoropropylene oxide dimethyl ester of 2280 g/mol number average molecular weight.

Poly(HFPO) dimethyl ester (63.6 g, 2280 g/mol, 93% difunctional, 180 g of dry tetrahydrofuran, and 110 g of FLUORINERT HFE 7200 perfluorinated liquid were charged in a 500 ml flask. $ZnCl_2$ (4 g) and 1.06 g of N,N-dimethylcyclohexylamine was then added. The mixture was placed under a nitrogen atmosphere and stirred at room temperature. $NaBH_4$ (2.32 g) was added in parts of 0.5 g every 15 min. The reaction was warmed up to 60° C. and stirred for 16 hrs. The reaction mixture was then cooled on an ice batch and 200 ml of 1.5 M HCl solution was slowly added. The mixture was transferred to a separation funnel and the organic phase was drained off. The organic phase was washed two times with 100 ml portions of water and dried over anhydrous magnesium sulfate. Finally, the FLUORINERT HFE 7200 liquid phase was stripped off resulting in 60.65 g of HFPO diol.

In a following step the HFPO diol was mixed with 100 g of HFE 7200 and 5.7 g of triethylamine. The mixture was placed under nitrogen and 4.98 g of acryloyl chloride was slowly added, and reaction mixture was stirred for 4 hrs at room temperature. The resultant salt was filtered off and the HFE was removed by rotary evaporation at reduced pressure.

Examples 1-6 and Comparative Example A

Perfluoropolyether, hydrocarbon polyether, optional filler, optional coagent, and optional peroxide were mixed together in the amounts shown in Table 1 using a SPEEDMIXER variable speed mixer (Model DAC 150, from FlackTek, Inc., Landrum, S.C.) operated for 1 minute (min) at 2000 revolutions per minute (rpm) and for 1 min at 3500 rpm.

Results of testing are reported in Table 1 (below).

TABLE 1

| | COMPARATIVE EXAMPLE A | EXAMPLE 1 | EXAMPLE 2 | EXAMPLE 3 | EXAMPLE 4 | EXAMPLE 5 | EXAMPLE 6 |
|---|---|---|---|---|---|---|---|
| Composition, parts by weight | | | | | | | |
| LTM dinitrile | 0 | 100 | 100 | 100 | 100 | 0 | 0 |
| HFPO diacrylate | 0 | 0 | 0 | 0 | 0 | 100 | 100 |
| Fluorosilicone | 100 | 0 | 0 | 0 | 0 | 0 | 0 |
| HP1 | 0 | 14.59 | 0 | 0 | 0 | 0 | 0 |
| HP2 | 0 | 0 | 6.56 | 0 | 0 | 0 | 0 |
| HP3 | 0 | 0 | 0 | 3.2 | 0 | 0 | 0 |
| HP4 | 0 | 0 | 0 | 0 | 29.2 | 0 | 0 |
| HP5 | 0 | 0 | 0 | 0 | 0 | 30.0 | 0 |
| HP6 | 0 | 0 | 0 | 0 | 0 | 0 | 38.0 |
| Peroxide | 1.0 | 0 | 0 | 0 | 0 | 5.0 | 5.0 |
| Filler | 0 | 8 | 8 | 8 | 8 | 8 | 8 |
| PROPERTIES ALPHA TECHNOLOGIES MDR at 177° C. | | | | | | | |
| Minutes | 6 | 45 | 45 | 45 | 60 | 12 | 6 |
| ML, in-lb (dN-m) | 1.41 (1.59) | 0.01 (0.01) | 0.00 (0.00) | 1.10 (1.24) | 0.01 (0.01) | 0.21 (0.24) | 0.30 (0.34) |
| MH, in-lb (dN-m) | 11.3 (12.8) | 6.5 (7.4) | 3.4 (3.8) | 11.8 (13.3) | 4.7 (5.3) | 55.0 (62.2) | 38.5 (43.5) |

TABLE 1-continued

| | COMPARATIVE EXAMPLE A | EXAMPLE 1 | EXAMPLE 2 | EXAMPLE 3 | EXAMPLE 4 | EXAMPLE 5 | EXAMPLE 6 |
|---|---|---|---|---|---|---|---|
| MH-ML, in-lb (dN-m) | 9.9 (11.2) | 6.5 (7.4) | 3.4 (3.8) | 10.7 (12.1) | 4.7 (5.3) | 54.8 (61.9) | 38.2 (43.2) |
| Tan delta at ML | 0.80 | 1.00 | no data | 0.18 | 1.00 | 0.48 | 0.27 |
| Tan delta at MH | 0.06 | 0.03 | 0.07 | 0.02 | 0.03 | 0.05 | 0.040.62 |
| Ts2, min | 0.62 | 28.0 | 41.0 | 1.09 | 49.8 | 0.22 | 0.29 |
| Tc50, min | 1.11 | 29.3 | 40.5 | 1.9 | 50.7 | 0.3 | 0.5 |
| Tc90, min | 3.2 | 33.7 | 43.5 | 3.2 | 56.0 | 0.4 | 0.6 |
| MDSC, ° C. | | | | | | | |
| Glass Transition Temperature, ° C. | −70 | −66 | −115 | −114 | −69 | no data | no data |
| Energy J/g-° C. | 0.15 | 0.10 | 0.20 | 0.20 | 0.14 | no data | no data |
| SOLVENT RESISTANCE, acetone | | | | | | | |
| Volume Swell, percent | 255 | 36 | 66 | 32 | 44 | 21 | 33 |

All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A curable composition comprising:
a fluorinated polyether represented by the formula:

$$Z^1-X^1_p$$

wherein
$Z^1$ represents a p-valent perfluorinated polyether group;
each $X^1$ group independently represents a functional group selected from the group consisting of: —I; —Br; —Cl; —CN; nonfluorinated monovalent organic groups containing at least one —I, —Br, —Cl, —CN; and nonfluorinated monovalent free-radically polymerizable ethylenically-unsaturated organic groups; and
p is an integer greater than or equal to 2; and
a nonfluorinated polyether represented by the formula $$Q^1-X^2_y$$

wherein
$Q^1$ represents a y-valent hydrocarbon polyether group;
each $X^2$ group independently represents a nonfluorinated monovalent free-radically polymerizable ethylenically-unsaturated organic group having from 2 to 6 carbon atoms
y is an integer greater than or equal to 2, and
wherein at least some of the p $X^1$ groups are reactive to at least some of the y $X^2$ groups to form a covalently cross-linked polymer network, and
wherein on a total weight basis the curable composition comprises:
30 to 90 weight percent of the fluorinated polyether; and
70 to 10 weight percent of the nonfluorinated polyether.

2. The curable composition of claim 1, wherein:
$Z^1$ comprises a polymer backbone comprising at least one divalent monomeric unit selected from the group consisting of —$C_4F_8O$—, —$C_3F_6O$—, —$C_2F_4O$—, —$CF_2O$—, and combinations thereof;
p is 2; and
each $X^1$ is independently bonded to the polymer backbone at a terminal position or at a position that is adjacent to the terminal position of the polymer backbone.

3. The curable composition of claim 1, wherein:
$Q^1$ comprises a polymer backbone comprising at least one divalent monomeric unit selected from the group consisting of —$C_4H_8O$—, —$C_3H_6O$—, —$C_2H_4O$—, —$CH_2O$—, and combinations thereof;
y is 2; and
each $X^2$ is independently bonded to the polymer backbone at a terminal position or at a position that is adjacent to the terminal position of the polymer backbone.

4. The curable composition of claim 1, further comprising a free-radical curing system.

5. The curable composition of claim 4, wherein the free-radical initiating system comprises a peroxide.

6. The curable composition of claim 1, further comprising a polyamine.

7. The curable composition of claim 1, further comprising filler.

8. The curable composition of claim 7, wherein the filler is selected from the group consisting of silicate fillers, carbon fillers, and combinations thereof.

9. The curable composition of claim 1, wherein the fluorinated polyether has a number average molecular weight of from 400 to 15000 grams per mole.

10. The curable composition of claim 1, wherein the fluorinated polyether comprises a random copolymer represented by the formula $$R^2CF_2O(CF_2O)_w(C_2F_4O)_x(C_3F_6O)_y(C_4F_8O)_zCF_2R^2$$

wherein w, x, y and z independently represent integers ranging from 0 to 30, with the proviso that w+x+y+z≥6; and
each $R^2$ independently represents a free-radically polymerizable ethylenically-unsaturated group —$CH_2$—$Z^3$—$CW^2$=$CW^2_2$, wherein:
each $W^2$ independently represents H, Cl, F, or $CF_3$, with the proviso that at least one $W^2$ is H; and
$Z^3$ represents —$OCH_2$— or oxycarbonyl.

11. The curable composition of claim 1, wherein the nonfluorinated polyether comprises a random copolymer represented by the formula $R^4CH_2O(CH_2O)_a(C_2H_4O)_b(C_3H_6O)_c(C_4H_8O)_dCH_2R^4$ wherein a, b, c, and d independently represent integers ranging from 0 to 30, with the proviso that a+b+c+d≥6; and each $R^4$ independently represents amino, alkylamino having from 1 to 6 carbon atoms, or a free-radically polymerizable ethylenically-unsaturated group —$CH_2$—$Z^4$—$CW^3$=$CW^3{}_2$, wherein:

each $W^3$ independently represents H or Cl, with the proviso that at least one W is H; and $Z^4$ represents —$OCH_2$— or oxycarbonyl.

12. The curable composition of claim 11, wherein each $R^4$ comprises aminoalkyl having from 1 to 2 carbon atoms.

13. A method of making a hybrid fluoroelastomer composition, the method comprising:
providing a curable composition according to claim 1; and
curing the curable composition.

14. A hybrid fluoroelastomer composition having a polymer backbone comprising:
perfluoropolyether segments having a number average molecular weight of 400 to 15,000 grams per mole, wherein the perfluoropolyether segments comprise at least one divalent monomeric unit selected from the group consisting of —$C_4F_8O$—, —$C_3F_6O$—, —$C_2F_4O$—, —$CF_2O$—, and combinations thereof; and
hydrocarbon polyether segments having a number average molecular weight of from 100 to 250000 grams per mole, wherein the hydrocarbon polyether segments are covalently bonded to the perfluoropolyether segments.

15. The hybrid fluoroelastomer composition of claim 14, wherein the hybrid fluoroelastomer composition has a volume swell in acetone of less than 100 percent.

16. The hybrid fluoroelastomer composition of claim 14, wherein the hybrid fluoroelastomer composition is formed into a shaped article selected from the group consisting of a gasket, a bearing, a hose, and an O-ring.

* * * * *

UNITED STATES PATENT AND TRADEMARK OFFICE
CERTIFICATE OF CORRECTION

| | |
|---|---|
| PATENT NO. | : 10,023,736 B2 |
| APPLICATION NO. | : 15/118736 |
| DATED | : July 17, 2018 |
| INVENTOR(S) | : Steven Corveleyn |

Page 1 of 1

It is certified that error appears in the above-identified patent and that said Letters Patent is hereby corrected as shown below:

In the Specification

<u>Column 12</u>
Line 44, Delete "(m)" and insert -- (μm) --, therefor.

<u>Column 16</u>
Line 58 (Approx.), Delete "($CH_2$)" and insert -- ($CH_2O$) --, therefor.

<u>Column 19</u>
Line 21, Delete "($CF_2$)" and insert -- ($CF_2O$) --, therefor.

Signed and Sealed this
Eighteenth Day of June, 2019

Andrei Iancu
*Director of the United States Patent and Trademark Office*